United States Patent [19]

Lobo

[11] Patent Number: 5,107,393
[45] Date of Patent: Apr. 21, 1992

[54] METALLIZED FILM CAPACITOR CONSTRUCTION

[75] Inventor: Edward M. Lobo, Shelton, Conn.

[73] Assignee: Magnetek Universal Manufacturing, Paramus, N.J.

[21] Appl. No.: 624,695

[22] Filed: Nov. 28, 1990

[51] Int. Cl.⁵ .................. H01G 1/14; H01G 9/10
[52] U.S. Cl. ......................... 361/306; 361/538
[58] Field of Search .................. 361/306, 537, 538

[56] References Cited

U.S. PATENT DOCUMENTS

| | | | |
|---|---|---|---|
| 2,246,933 | 6/1941 | Deeley | 361/538 |
| 2,332,891 | 10/1943 | Clark | 361/272 |
| 4,236,038 | 11/1980 | Taylor | 361/306 |

Primary Examiner—Donald Griffin

[57] ABSTRACT

A metallized film capacitor and method of manufacture in which the tab connected to the bottom end of the wound capacitor section has insulating tape along the part of the length thereof which extends along the section and the section is within an insulating tube in the capacitor can. A second tab has one end connected to the top end of the capacitor section. A liner having a foldable section is attached to the ends of the terminal studs on the inside of the can cover and the uninsulated ends of the tabs which are connected to the terminal studs are insulated and protected from other parts of the capacitor by being sandwiched between the folded sections of the liner.

14 Claims, 2 Drawing Sheets

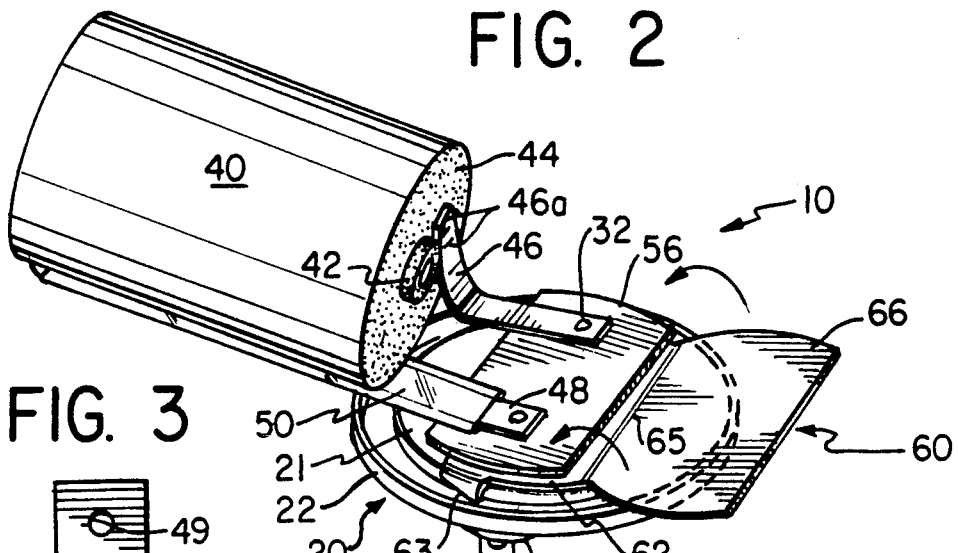
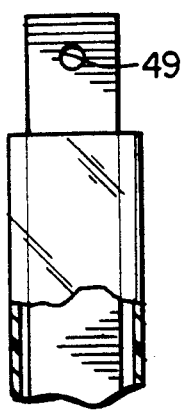
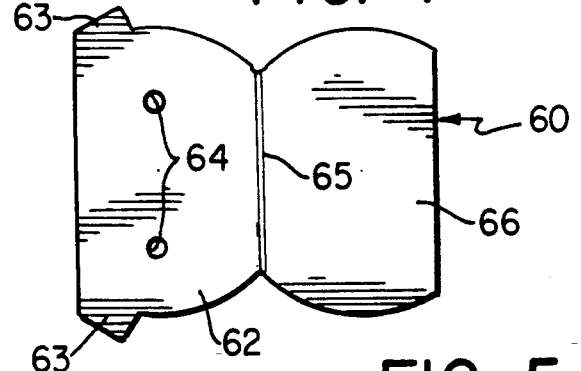
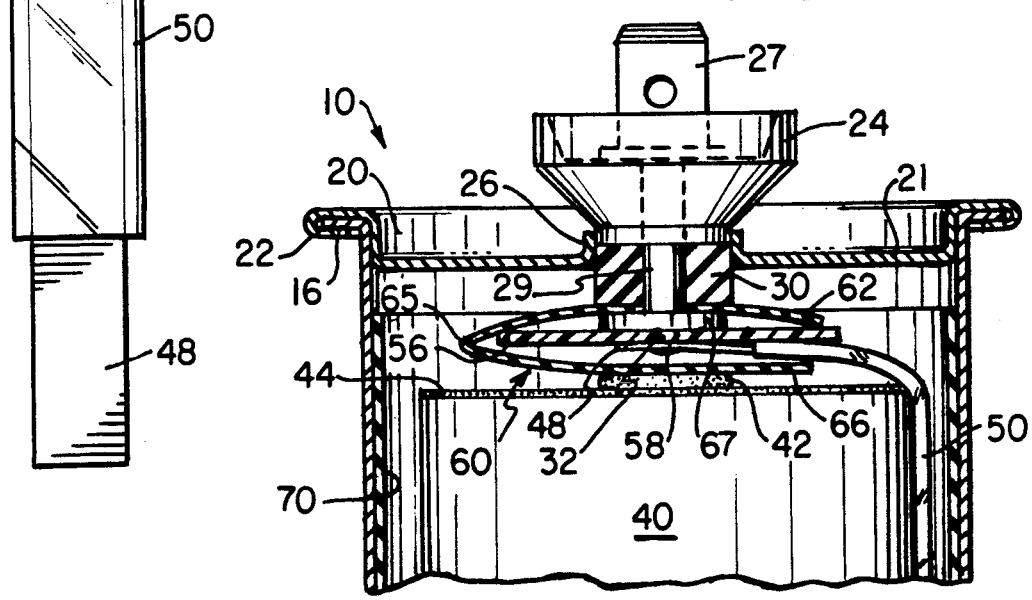

METALLIZED FILM CAPACITOR CONSTRUCTION

BACKGROUND OF THE INVENTION

Metallized film capacitors are widely used in various types of products, for example, ballasts for fluorescent and high intensity discharge lamps, motors, etc. It is always an object to manufacture such capacitors as inexpensively as possible. To accomplish this, would include any one or more of the reduction of parts and assembly steps and the reduction of rejects of the manufactured parts. All of these serve to decrease the final manufacturing cost.

An existing arrangement for manufacturing a metallized film capacitor includes winding the film capacitor section on a bobbin in the usual roll and providing a plastic insulating wrap around the film roll. Thereafter, a bottom end cup of Kraft paper or a plastic insulator is placed within the capacitor metal outer can, and a plastic terminal insulator and a liner piece is provided for the can cover. A tab is provided to connect an electrode on each end of the capacitor section to a respective terminal on the can cover. The capacitor film section is wrapped in the plastic insulator wrap in such a fashion that the electrodes and their respective tabs are insulated from each other. The wrapped capacitor section is placed within a tube of paper or cardboard to insulate the tab from the can. The cover liner section insulates the tabs at the points of connection to the terminals.

While such arrangement is adequate, it requires substantial time and effort to assemble, relatively speaking, and is prone to assembly difficulties and errors. Also, the connecting tab from the bottom of the capacitor section must be sandwiched between the plastic wrapper and the capacitor section cardboard insulating tube with a great deal of care so that it will not tear and/or short out against the foil on the side of the capacitor section. Also, the uninsulated end of tab from the top capacitor section electrode must be folded with great care and properly insulated before its connection to the electrode on the can cover.

BRIEF DESCRIPTION OF THE INVENTION

The present invention utilizes a paper insulating tube in the capacitor can into which the capacitor section without a plastic wrapping, is inserted. The tube fits within the can on top of an insulating paper liner at the bottom of this can. The tab connected to the electrode at the bottom of the capacitor section and which extends upwardly along the side of the capacitor section in the can is covered by an insulating sleeve, preferably of a tape of suitable material. A specially constructed insulating paper liner with foldable section is provided between the capacitor section top electrode and the inside of the can cover.

In assembling the capacitor of the invention, the paper tube with the capacitor section and its attached electrodes and connecting tabs, the tab from the bottom electrode being within its insulating sleeve, are placed into the can. The uninsulated tab from the top capacitor section electrode and the uninsulated end of the tab connected to the bottom electrode are already connected to the terminal studs on the inside of the can cover. The cover liner is then folded over the exposed uninsulated tab portions to protect and insulate them from the cover. The cover is then fastened to the container.

By utilizing the construction of the subject invention, capacitors can be manufactured in a more simplified manner with fewer rejects. This substantially reduces the manufacturing cost.

OBJECTS OF THE INVENTION

It is an object of the present invention to provide a novel method and construction for a metallized film capacitor.

Another object is to provide a metallized film capacitor which can be assembled without wrapping the capacitor section in a plastic wrap to provide insulation from the connecting tab.

Still a further object is to provide a metallized film capacitor in which the tab extending along the side of the capacitor section is protected by an insulating sleeve.

An additional object is to provide a metallized film capacitor in which the uninsulated parts of the tab from the bottom electrode and the tab connected to the top capacitor section electrode are protected by a foldable liner between the inside of the can cover and the capacitor section top electrode.

BRIEF DESCRIPTIONS OF THE DRAWINGS

Other objects and advantages of the present invention will become more apparent upon reference to the following specification and annexed drawings in which:

FIG. 2 is a perspective view showing the capacitor can cover open with the tabs connected to the capacitor electrodes, being connected to the terminals on the cover;

FIG. 3 is an elevational view of the tab connected to the bottom electrode with the protective film sleeve thereon;

FIG. 4 is a plan view of the cover liner; and

FIG. 5 is an elevational view in cross section of the upper portion of the capacitor showing the assembly.

DETAIL DESCRIPTION OF THE INVENTION

Figure 1:
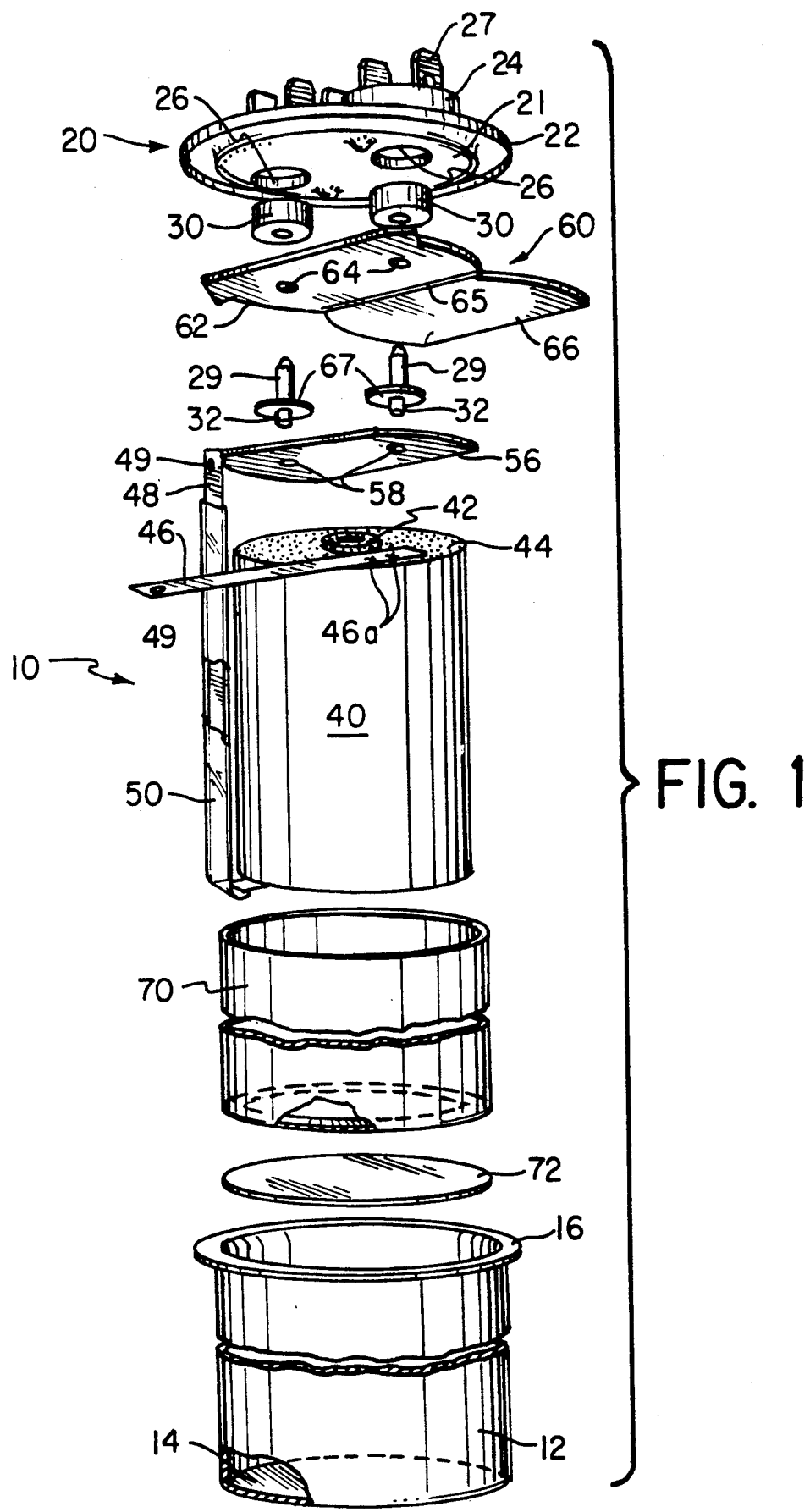
FIG. 1 is an exploded perspective view of the components of the capacitor.

Referring to the drawings, particularly to FIG. 1, the capacitor 10 has the usual outer metal can 12 which can be of circular, oval or other desired shape. The lower end of the can 12 has a bottom wall 14 and a lip 16 is formed around its open upper end to which the can cover 20 is to be sealed, as described in detail below. The can cover 20 has the same overall shape as the can 12. For illustrative purposes, a circular can 12 is shown so that the cover 20 is also circular. It should be understood that if the can 12 were oval or elliptical, then the cover would have a similar shape.

The cover 20 has a central reduced size depressed portion 21, of the same general overall shape as that of the cover and a peripheral rim 22 which is used to seal the cover to the can lip 16 as shown in FIG. 5. On the upper surface of the cover 20 in the depressed portion 21, one stud of a pair of spaced studs 29 of electrically conductive material is attached within a respective insulator 30 fit within a punched out raised neck 26 of the cover. The insulator 30 can be of rubber, phenolic or other suitable material.

The upper end of each stud 29 has a terminal 27 to which various wires (not shown) are to be connected. The stud 29 is welded to terminal 27 while under pressure. Each terminal 27 is surrounded by a generally frusto-conical plastic insulating cup 24 whose lower neck end is held by force fit within the upper part of the punched out cover neck 26. The bottom end 32 of each stud 29 is to be connected to an end of one of the tabs which is connected to a respective capacitor section electrode, as described below.

The capacitor also includes the usual section 40 of the metallized film material wound around a central core, or bobbin, 42 of insulating material. The size of the section both in height and in a number of film material turns is determined by the amount of capacitance to be provided by the capacitor. An electrically conductive electrode 44 is connected to each of the upper and lower ends of the capacitor section to make the necessary electrical connection to the capacitor section 40. The electrode 44 at the upper end of the capacitor section is seen most clearly in FIGS. 1, 2 and 5.

First and second electrical tab members 46 and 48 are provided to connect the upper and lower electrodes 44 to their respective terminal studs 29. The tabs are elongated, electrically conductive metallic foil members of suitable width and thickness depending upon the capacitor current and voltage rating. Tab 46 has one end connected to the upper capacitor electrode 44 and tab 48 has one end (not shown) connected to the lower electrode. The connection from a tab end to the respective electrode is usually by spot welding, such as shown at points 46a in FIG. 1.

Tab 46 connected to the upper electrode 44 is uninsulated along its length. A sleeve 50 of polypropylene tape or polyester tape is formed around a majority of the length of tab 48, leaving an uninsulated region at the bottom thereof for connection to the lower electrode 44 and an another uninsulated region at the upper tab end where it is to be connected to a terminal stud 29.

Also provided between the interrupter 56 and the undersurface of the can cover 20 is a liner member 60 of paper, cardboard or other suitable insulating material. The liner 60 has a first section 62 with a pair of holes 64 therein, which also can accommodate passage of the ends 32 of the studs 29, and a second section 66. The liner is held to the can cover by a washer 67 near the lower end of each stud 29. The washers 67 engage the lower face of liner section 62 and old the liner to the studs.

The assembly for the cover 20 also includes an interrupter bridge 56 which is of phenolic insulating material. Interrupter 56 has a pair of holes 58 therein through which the ends 32 of the studs 29 below the washers 67 pass.

The first and second sections 62 and 66 of the liner 60 are adapted to be folded with respect to each other along a fold line 65. The fold line can be pre-formed on the liner to facilitate accuracy during assembly. Each of the liner sections 62 and 66 is shown as having approximately the same size and shape as the spacer 56, although this is not necessary. Section 62 also has bent ear 63 at each end thereof. The outer surface of each ear 63 is at an angle with respect to the length of liner section 62. The purpose of the ears is to lock the cover to can during processing before the cover is seamed to the can.

The remaining components of the capacitor assembly includes a tube 70 of suitable insulating material such as paper or cardboard and of a shape corresponding to the capacitor section 40. Tube 70 can be of a collapsed material which is expanded to cylindrical shape. There is also a bottom insulator 72 which has a shape corresponding to that of the lower end of the capacitor section and its connected electrode and the can bottom.

The assembly of the capacitor of the subject invention proceeds as follows. Several of the components are formed separately. That is, tabs 4 and 48 are made as separate components, the tab 48 being covered by the insulating tape 50 or sleeve along a part of its length. The capacitor section 40 is wound around core 42 and the electrodes 44 are attached at the top and bottom of the capacitor section. The lower end of the tab 46 is connected to the top electrode 44 at points 46a and the uninsulated lower end of the tab 48 (not shown) is electrically connected to the bottom electrode 44 of the capacitor section in a similar fashion.

The cover sub-assembly is also separately formed by first punching out the openings 26 and then assembling the terminal-electrodes 27, the insulator 30 and the insulating cups 24. The studs 29 are passed through the holes 64 of liner section 62 until the washers 67 engage the liner and press it against the insulators 36. The top ends of the studs 29 are electrically connected to the terminals 27 on the cover. The interrupter 56 is then placed over the liner section 62 by placing the stud ends 32 through its holes 58.

Next, the sub-assembly of the capacitor section, electrodes and tabs, and a cover sub-assembly are assembled together. As seen in FIG. 2, the upper end of each electrode 46, 48 is placed over the lower end 32 of its respective stud 29 extending below the bridge 56 and is staked thereto, such as by welding or soldering. As seen, in FIG. 1 the insulated sleeve 50 of the tab 48 lies along the side of the capacitor section and electrically insulates the tab 48 from the capacitor for the part of its length which lies along the capacitor. As seen in FIG. 2, the uninsulated upper end of each tab lies on the insulated bridge 56.

The second section 66 of the liner 60 is then bent back along the fold line 65 and over the bridge 56 to cover the uninsulated tab ends of the bridge. As shown in FIG. 5, the second section 66 covers the uninsulated ends of the tabs 46, 48 which are sandwiched between the folded second section 66 and the bridge 56.

To complete the assembly, the bottom insulator piece 72 is placed into the can as is the insulator tube 70. Next, the capacitor section 40, the cover 20 being attached via the tabs being connected to the stud ends 32 as previously described, is inserted into tube 70. It should be understood that the tube 70 can first be placed into the can and the capacitor section inserted or the tube and capacitor section assembled outside of the can. The can cover 20 is then bent back by about 90 degrees as the capacitor section is being inserted in the can so that the cover will have the proper position lying on the top of the can.

The cover 20 is then placed on the can. The ears 63 on liner 60 engage the inside of the can to hold the cover during processing. The cover peripheral edge 22 is seamed around the can lip 16. The cover originally has a hole (not shown) through which the capacitor impregnant is added to the can. This can be carried out in an inert atmosphere environment if needed. The hole is sealed. Any baking or drying steps can be carried out as needed.

As seen in FIG. 5, with the capacitor fully assembled, the liner second section 66 lies over the uninsulated ends of the tabs 46, 48. The liner second section 66 also rests on the top end of the capacitor section core 46. The uninsulated ends of the tabs are sandwiched between the folded section 66 of the liner and the bridge 56. This fully protects and insulates the tab to terminal connections from the capacitor section upper electrode 44 even if the capacitor is turned upside down and the capacitor section shifts toward the cover. The tab 48 is protected from the capacitor section by its sleeve 50 and there is no need to wrap the section. The section 40 is insulated from the can by the tube 70.

What is claimed is:

1. A metallized film capacitor comprising:
   a wound capacitor metallized film section;
   an electrically conductive tab having one end connected to an end of the capacitor section, the tab being bent and extending along the length of the section and adjacent thereto; and
   a sleeve of insulating material over the width of the tab between said tab and the capacitor section and extending along the length of the tab which lies adjacent the capacitor section.

2. A capacitor as in claim 1 wherein said sleeve is made of tape.

3. A capacitor as in claim 1 further comprising:
   a can having an open end and a closed end into which the capacitor section is to be placed;
   a cover for said can open end, said cover having at least one electrically conductive terminal stud attached to and extending therethrough, one end of the stud which is outside of the can having an electric terminal thereon, the other end of the tab to be electrically connected to the end of the stud within the can,
   an insulating liner member within the can attached to the stud end within the can for insulating the other end of the tab connected to the stud from other parts of the capacitor.

4. A capacitor as in claim 3 wherein said liner has first and second sections with the first section being foldable over said second section, with the said other end of the tab sandwiched therebetween.

5. A capacitor as in claim 4 wherein said second liner section has at least one hole which fits over the stud end within the can to attach the liner to the stud.

6. A capacitor as in claim 4 further comprising a tube of insulating material within said can, said capacitor section and the portion of said first tab which extends along the length of the capacitor section being within the tube.

7. A capacitor as in claim 6 further comprising a tube of insulating material within said can, said capacitor section and the portion of said first tab which extends along the length of the capacitor section being within the tube.

8. A capacitor as in claim 3 further comprising a second electrically conductive tab having one end electrically connected to the other end of the capacitor section which is adjacent the can cover, the other end of the second tab being electrically connected to the end of another stud on the cover extending into the can, said liner first section also insulating the other end of said second tab.

9. A capacitor as in claim 8 wherein said liner has first and second sections with the first section being foldable over said second section, with the said other ends of the tabs sandwiched therebetween.

10. A metallized film capacitor comprising
    a wound capacitor metallized film section
    an electrically conductive tab having one end connected to the bottom end of the capacitor section, the tab being bent and extending along the length of the capacitor section and adjacent thereto toward the top of the section,
    an insulator between the tab and the capacitor section,
    a can having an open end and a closed end into which the capacitor section is to be placed;
    a cover for said can open end, said cover having at least one electrically conductive terminal stud attached to and extending therethrough, one end of the stud which is outside of the can having an electric terminal thereon, the other end of the tab to be electrically connected to the end of the stud within the can, and
    an insulating liner member within the can attached to the stud end within the can for insulating the other end of the tab connected to the stud from other parts of the capacitor.

11. A capacitor as in claim 10 wherein said liner has first and second sections with the first section being foldable over said second section, with the said other end of the tab sandwiched therebetween.

12. A capacitor as in claim 11 wherein said second liner section has at least one hole which fits over the stud end within the can to attach the liner to the stud.

13. A capacitor as in claim 10 further comprising a second electrically conductive tab having one end electrically connected to the end of the capacitor section which is adjacent the can cover, the other end of the second tab being electrically connected to the end of another stud on the cover extending into the can, said liner first section also insulating the other end of said second tab.

14. A capacitor as in claim 12 wherein said liner has first and second sections with the first section being foldable over said second section with the said other ends of the tabs sandwiched therebetween.

* * * * *